July 31, 1928.  1,678,689
M. CENTORRINO
INSTRUCTING DEVICE
Filed May 2, 1927   2 Sheets-Sheet 2
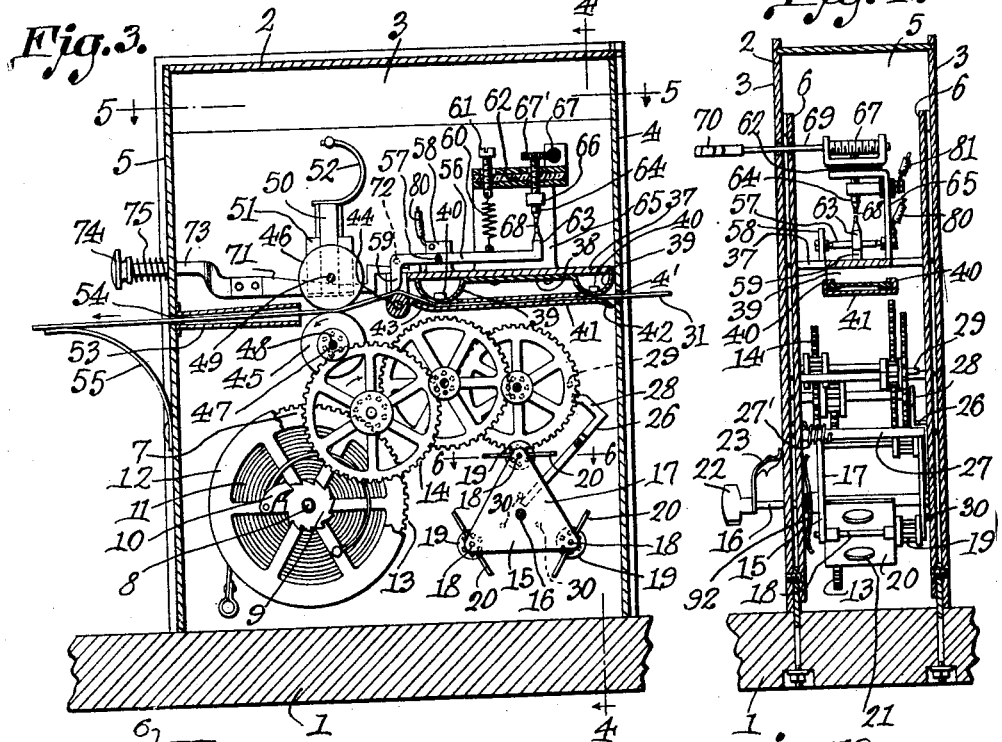
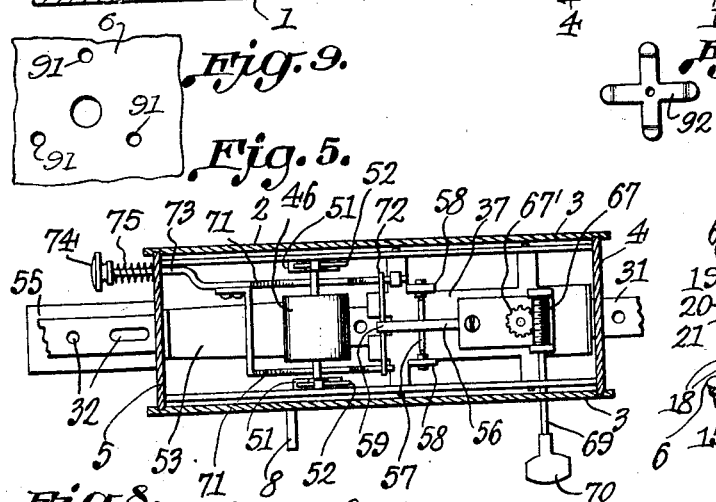
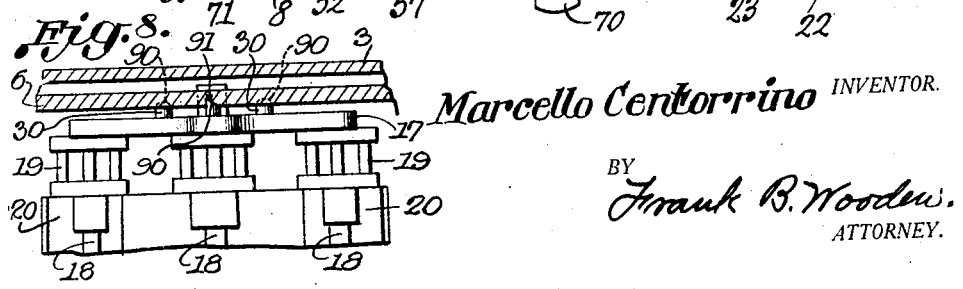
Marcello Centorrino INVENTOR.
BY Frank B. Wooden.
ATTORNEY.

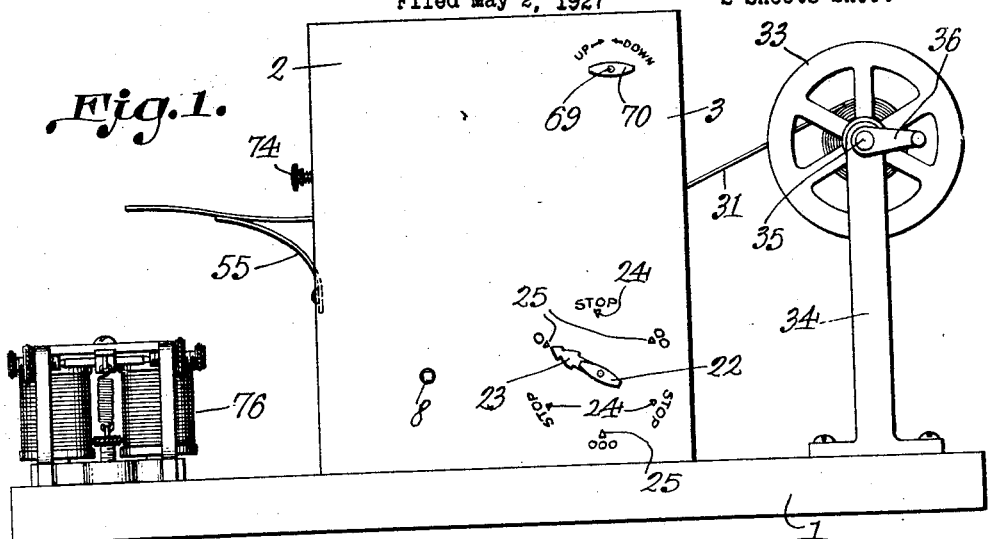
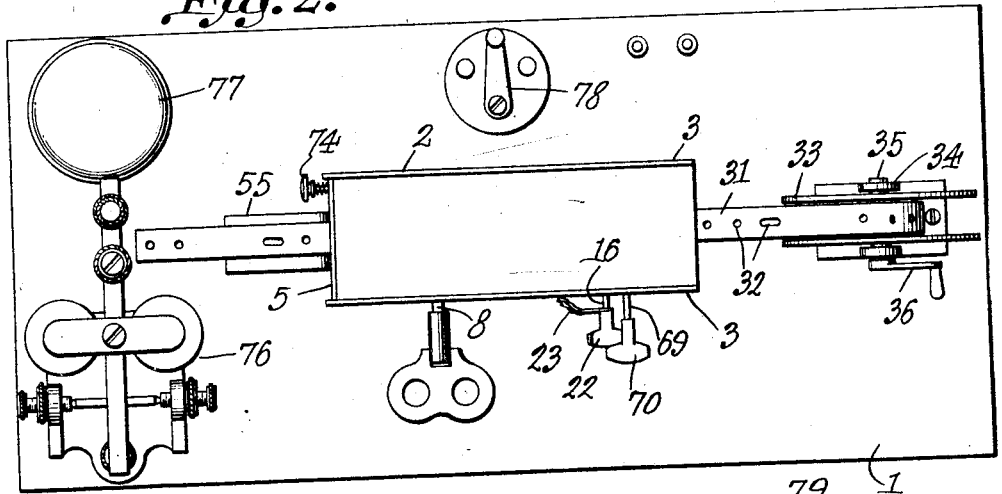
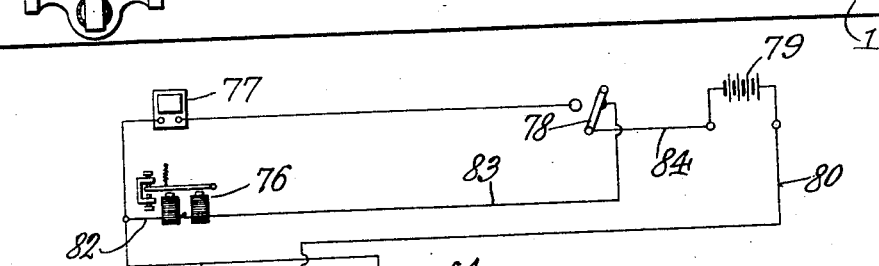
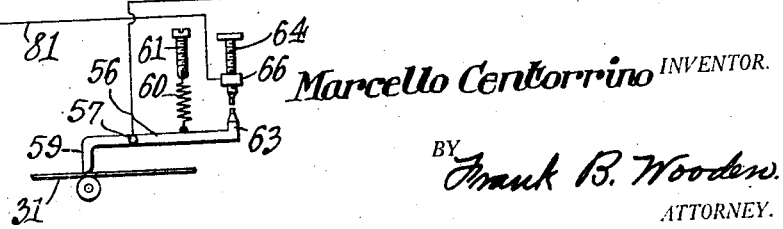

Patented July 31, 1928.

1,678,689

UNITED STATES PATENT OFFICE.

MARCELLO CENTORRINO, OF NEW YORK, N. Y.

INSTRUCTING DEVICE.

Application filed May 2, 1927. Serial No. 188,190.

This invention relates to an instructing device and more particularly to an instrument for teaching student telegraphers to read code messages by sound.

An object of the invention is to provide a device that will reproduce the sound of the ordinary telegraphic sounder or the well-known buzzer, as used in radio work.

Another object of the invention is to provide a governor mechanism whereby the speed of the reception can be regulated at the will of a student operator.

Another object of the invention is to provide motor-driven means for operating the device so that when the device has been adjusted to the proper speed, it requires no further attention on the part of the student.

A further object of the invention is to provide a record in the form of a tape which can be driven through the device at the desired speed and will reproduce the code messages impressed thereon with the same accuracy as a skilled operator, thus giving the student all of the benefits obtainable from the assistance of a second operator.

A still further object of the invention is to provide a record which can be replaced from time to time with a more difficult one as the student becomes more proficient.

A still further object is to provide means whereby the record may be rewound after it has been reproduced.

Other objects and advantages of the invention will be apparent during the course of the following description.

In the accompanying drawings, forming a part of this specification, and in which like numerals are employed to designate like parts throughout the same, Figure 1 is a side elevation of the complete device embodying the present invention, Figure 2 is a top plan view thereof, Figure 3 is a vertical longitudinal section of the main housing, Figure 4 is a vertical cross-section on the line 4—4 of Figure 3, Figure 5 is a horizontal section on the line 5—5 of Figure 3, Figure 6 is a fragmentary horizontal section on the line 6—6 of Figure 3, showing a top plan view of the governor mechanism, Figure 7 is a diagrammatic view showing the electrical circuits.

Figure 8 is an enlarged fragmentary view of the governor mechanism,

Figure 9 is a fragmentary elevation of one of the supporting frames showing the bearing for the governor shaft and the notches surrounding it, and Figure 10 is a detail view of the spring which is mounted on the governor shaft.

It is a well-known fact that student telegraphers find their studies hampered by not always having an experienced or competent operator at hand to assist them. It is with this difficulty in mind that the present invention has been perfected.

In the drawings, wherein for the purpose of illustration is shown a preferred embodiment of my invention, the numeral 1 designates a base on which the various parts of the device are assembled.

A housing 2 is mounted on the base 1 and comprises side walls 3 and end walls 4 and 5. Secured to the side walls 3, within the housing 2, are supporting frames 6 which carry the operating mechanisms to be hereinafter more fully described.

A spring motor 7 is arranged within the lower portion of the housing 2 and comprises a main shaft 8 mounted between the frames 6 and carrying a ratchet wheel 9 for cooperation with the usual spring-pressed dog 10 to wind the mainspring 11 within the drum 12. The drum 12 carries a gear 13 meshing with a suitable train of gears 14 to transmit power from the mainspring 11 in the usual way.

A variable speed governor 15 is mounted on the shaft 16 which, in turn, is journaled in the supporting frames 6. The governor 16 includes a frame 17 having a series of shafts 18 mounted therebetween equidistant from the governor shaft 16. Each shaft 18 carries a pinion 19 designed to mesh with one of the train of gears 14 to control the speed thereof. Each shaft 18 also carries a fan 20 having holes 21 of a suitable size to retard the motor to a predetermined speed.

The holes 21 in the different fans 20 are of different sizes to produce different speeds as the various pinions 19 are brought into registry with one of the train of gears 14. In order to operate the governor properly, the governor shaft 16 is extended through one side wall 3 of the housing 2 and is provided on its end with a finger-engaging knob 22. This knob 22 carries a pointer 23 which registers with graduations 24 on the side wall 3 to locate the stop positions and with graduations 25 to indicate the various speed positions.

A stop lever 26 is mounted on a shaft 27 and has one end 28 disposed at a right angle to its major axis to be projected into the path of a stop pin 29 mounted upon one of the train of gears 14 at times. The lower end of the stop lever 26 is disposed in the path of actuating pins 30 mounted on the governor frame 17 and properly spaced thereon to move the lever 26 and bring its right-angled end 28 in the path of the stop pin 29 during the time that the governor is shifted from one speed to another. A torsional spring 27' surrounds the shaft 27 and has one end secured thereto. The opposite end of the torsional spring 27' is secured to the supporting frame 6. After the proper tension has been placed upon the spring 27', the tendency of the spring will be to hold the shaft 27 and the stop lever 26 in the position shown in Figure 3 of the drawings.

This description covers my preferred form of driving means, but it is to be understood that any other suitable driving means may be employed, if desired.

A record 31 is provided and, as shown in the drawings, it is in the form of a tape having perforations 32. These perforations 32 are in the form of dots and dashes, as ordinarily used in telegraphic code. The record is wound on a reel 33, which is supported by a standard 34 mounted on the base 1 at a suitable distance from the housing 2. The reel 33 is journaled in the standard 34 by means of a shaft 35. This shaft 35 carries a crank 36 on one end for rewinding the record after it has passed through the machine, as will be hereinafter more fully described.

A supporting plate 37 is secured to the frame 6 above the spring motor 7 and carries on its under side a hanger 38. The hanger 38 has two semicircular off-set portions 39 intended to receive the securing lugs 40 of the record guide 41. This record guide 41 has one end bent downwardly at 42 to direct the record 31 into the guide 41, while the other end 43 is bent upwardly to direct the record 31 over the fixed cylindrical support 44.

The record 31 then passes between the feeding rollers 45 and 46. The feeding roller 45 is supported on the shaft 47 and is rotated by the engagement of its pinion 48 with one of the train of gears 14. The roller 45 is not movable vertically. The roller 46 is disposed above the roller 45 and is provided with a shaft 49 mounted in the slide 50, which is movable in the guides 51 under the action of the spring 52 to press the roller 46 downwardly toward the roller 45 and into engagement with the record 31 to feed the same out of the housing 2 through the guide 53 and the slot 54 in the end wall 5.

A curved guide 55 is secured to the end wall 5 to guide the record 31 away from the housing 2.

A circuit-making lever 56 is supported by trunnions 57 pivoted in ears 58 extending upwardly from the supporting plate 37. One end 59 of the lever 56 is bent downwardly and is disposed directly above the cylindrical support 44 and is intended to bear on the record 31 as it passes over the support 44 under the influence of a spring 60 secured to the circuit-making lever 56 and to an adjusting screw 61 supported in a strip of insulating material 62. As the record 31 passes through the housing in the direction indicated by the arrow in Figure 3, the holes 32 therein will pass directly under the end 59 of the lever 56, causing a vertical motion thereof, which motion when transferred to the opposite end 63 of the lever 56 is greatly multiplied and causes the end 63 to come into engagement with the contacting screw 64 to close an electrical circuit, as will hereinafter be described.

A vertical support 65 rises from the supporting plate 37 and carries the insulating stop 62. The contact screw 64 is threaded into a block 66, which is mounted in and insulated from the vertical support 65. A worm 67 and a worm gear 67' are provided for the contact screw 64 whereby accurate adjustment of the gap 68 may be secured. A shaft 69 extends from the worm 67 through the side wall 3 of the housing 2 and carries the finger-engaging knob 70.

When the record 31 has been run through the machine, or to any point thereon, the operator may repeat the record, if he desires. In order to accomplish this result, a double wedge structure 71 is provided. This structure passes under the shaft 49 of the roller 46 and under a pin 72 on the lever 56. When the plunger 73 is depressed by means of the knob 74 against the action of the spring 75, the roller 46 and the end 59 of the lever 56 are raised out of engagement with the record, at which time the student may rotate the reel 33 in the proper direction by means of the crank 36 to completely rewind the record 31.

The circuit for accomplishing the desired result is clearly shown in Figure 7 of the drawings wherein the numeral 76 indicates the ordinary telegraphic sounder, and 77 indicates a buzzer, as used in radio work.

When the switch 78 is thrown in the position as shown in Figure 7 of the drawings, a current from the battery 79 will flow through the conductor 80 to the circuit-making lever 56 and when the end 63 thereof is elevated due to the end 59 being lowered by a depression in the record 31, the circuit is closed to the contact screw 64, the conductors 81 and 82, the telegraphic sounder 76, the conductor 83, the switch 78, the conductor 84, and back to the battery 79. When the switch 78 is thrown in the opposite direction, the device will operate the same as previously described, except that the buzzer 77 will be included in the circuit and the telegraphic sounder 76 will be cut out.

The upper record guiding surface of the cylindrical support 44 is positioned slightly above the record guide 41 and the contacting surfaces of the rollers 45 and 46. The record is passed through the slot 4' in the end wall 4, through the guide 41, upwardly over the bent end 43 thereof, over the support 44, and thence downwardly between the feeding rollers 45 and 46. This elevation of that part of the record with which the end 59 of the circuit-making lever comes in contact will assure the proper operation of the device without danger of the end 59 becoming caught in any of the openings 32 in the record 31.

The pins 30 have their ends beveled, as shown at 90, to engage with similarly shaped notches 91 formed in the frame 6 to permit a clock-wise movement of the governor shaft, and to prevent a counter clock-wise movement thereof. A spring 92 of any suitable form is interposed between the governor and the frame 6 at the other end thereof and is adapted to normally urge the beveled ends 90 of the pins 30 into engagement with the notches 91 in the plate 6. The governor is rotated until one of its pinions 19 is in mesh with one gear of the gear train 14, as shown in Figure 3, at which time all of the pins 30 are forced into the notches 91 by the action of the spring 92, thus holding the governor pinion securely in mesh with the gear train 14.

The operation of the device is as follows:

The record 31, which in the present application of the invention is shown as a tape, is threaded through the opening 4' in the end wall 4, thence through the guide 41, over the support 44, between the feeding rollers 45 and 46, through the guide 53, the opening 54, in the opposite end wall 5, and over the curved guide 55.

The spring motor is wound up in the usual way and the governor 15 is set at the desired speed. The gap 68 is properly adjusted and the device is now in operating condition and will feed the record through the machine and operate either the telegraphic sounder 76 or the buzzer 77 at the speed regulated by the governor 17. If the operator wishes to change the speed of the device, he has only to turn the thumb-engaging button 22 to bring the pointer 23 to any one of the speed graduations 25 on one of the side walls 3 of the housing 2, as previously described. When it is desired to stop the device, the pointer 23 through the operation of the thumb-engaging knob 22, is moved to any one of the stop graduations 24.

Whenever the operator wishes to stop the machine and repeat the record, or completely rewind it, the pointer 23 is turned to any one of the stop graduations 24, and the plunger 73 carrying the wedges 71 is depressed by means of the button 74, thus elevating the feeding roller 46 and the end 59 of the circuit-making lever 56, at which time he may turn the crank 36 on the shaft 35 to rewind the record 31 on its reel 33.

Having thus described my invention, I claim:

1. In a device of the class described, a record having telegraphic code signals thereon; a feeding mechanism for the record; a driving mechanism operatively connected with the said feeding mechanism; a governor for controlling the speed of the driving mechanism, said governor comprising a pivoted frame, a shaft journaled therein, a pinion mounted on the shaft so as to be rotated by the driving mechanism and a fan secured to the said shaft and rotatable therewith to control the speed thereof; a pivoted stop lever engaged at one end by a pin on the pivoted governor frame and by an abutment on the driving mechanism at its other end when the said pivoted frame is rotated and means for reproducing telegraphic code signals.

2. In a device of the class described, a record having telegraphic code signals thereon; means for reproducing the code signals; a feeding mechanism for the record; a driving mechanism operatively connected with the said feeding mechanism, a gear wheel associated with the driving mechanism, and an abutment on the gear wheel; a governor for controlling the speed of the driving mechanism, said governor comprising a pivoted frame, a pin on the frame, a shaft journaled therein, and a pinion mounted on the shaft, and in mesh with the said gear wheel of the driving mechanism at times; and a pivoted stop lever which is moved into the path of the abutment on the gear wheel by the pin on the pivoted frame when the governor pinion is disengaged from the gear wheel of the driving mechanism.

3. In a device of the class described, a record having telegraphic code signals thereon; a feeding mechanism for the record; a driving mechanism operatively connected with the said feeding mechanism, said driving mechanism including a spring motor and a gear wheel; a governor for controlling the speed of the spring motor, said governor comprising a pivoted frame, a series of pinions journaled in the frame and meshing one at a time with the gear wheel when the pivoted frame is rotated, a fan secured to each pinion to rotate therewith, each fan having an opening of different size, a pivot element for rotating the governor frame, a support for the pivot element, graduations on the support, and a pointer secured to the pivot element for cooperation with the graduations to show what position the governor is in; and means for reproducing code signals.

4. In a device of the class described, a record having telegraphic code signals thereon; a feeding mechanism for the record; a spring motor for driving the feeding mechanism, a gear train embodied in the motor; a governor comprising a pivoted frame, a series of pinions for engagement with one gear of the gear train, a series of fans having different air contacting areas secured to the pinions, and a pivot element for the governor frame whereby a pinion may be selected for engagement with the gear train; and a brake for engagement with the gear train during the speed changing operation.

5. In a device of the class described, a record having telegraphic code signals thereon; a forward feeding mechanism for the record including a spring pressed shaft and a roller on the shaft and in contact with the record; a driving mechanism for the said feeding mechanism; means for reproducing the telegraphic code signals on the record, said means including a pivoted circuit maker one end of which contacts with the record, and a pin on the circuit maker; and a spring returned plunger, a first cam surface on the plunger under the spring pressed shaft of the forward feeding mechanism, and a second cam surface on the spring returned plunger under the pin on the circuit maker whereby the roller on the spring pressed shaft and the circuit maker are raised out of contact with the record to permit a reverse movement thereof.

6. In a device of the class described, a record having telegraphic code signals thereon; a feeding mechanism for the record; a motor for driving the feeding mechanism, a gear train embodied in the motor; a governor comprising a pivoted frame, a series of pinions for engagement with one gear of the gear train, a series of fans having different air contacting areas secured to the pinions, and a pivot element for the governor frame whereby a pinion may be selected for engagement with the gear train; a brake lever for engagement with the gear train during the speed changing operation; pins secured to the governor frame, beveled ends on the pins; a supporting frame for the governor, notches in the supporting frame in circular alignment with the pins on the governor frame, beveled surfaces in the notches for cooperation with the beveled ends of the pins to permit rotation of the governor frame in one direction and to prevent rotation thereof in the opposite direction when the pins are in the notches; said pins also engaging said brake lever one at a time during the gear changing operation to stop the gear train; and a spring for normally urging said pins into engagement with said notches.

In testimony whereof I affix my signature.

MARCELLO CENTORRINO.